(12) United States Patent
Ye et al.

(10) Patent No.: US 9,639,732 B2
(45) Date of Patent: May 2, 2017

(54) APPARATUS AND SYSTEM FOR OPERATING A HANDHELD BARCODE SCANNER IN A PRESENTATION MODE

(71) Applicant: SYMBOL TECHNOLOGIES, INC., Lincolnshire, IL (US)

(72) Inventors: David C Ye, Baldwin, NY (US); Joseph S. Slowik, Bellport, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 14/594,708

(22) Filed: Jan. 12, 2015

(65) Prior Publication Data
US 2016/0203345 A1   Jul. 14, 2016

(51) Int. Cl.
G06F 17/00   (2006.01)
G06K 7/10   (2006.01)

(52) U.S. Cl.
CPC .................................. *G06K 7/109* (2013.01)

(58) Field of Classification Search
CPC . G06K 7/10861; G06K 7/10881; G06K 7/109
USPC .......................... 235/462.14, 462.45, 472.01
See application file for complete search history.

(56) References Cited

U.S. PATENT DOCUMENTS

| 5,214,270 | A | 5/1993 | Rando |
| 5,306,900 | A | 4/1994 | Metlitsky et al. |
| 5,992,747 | A | 11/1999 | Katoh et al. |
| 6,332,575 | B1 * | 12/2001 | Schuessler ......... G06K 7/10693 235/462.13 |
| 7,746,511 | B2 | 6/2010 | Hamilton et al. |
| 8,474,712 | B2 * | 7/2013 | Kearney ............ G06K 7/10821 235/383 |
| 2007/0205289 | A1 | 9/2007 | Watanabe et al. |
| 2012/0248188 | A1 * | 10/2012 | Kearney ............ G06K 7/10722 235/440 |

FOREIGN PATENT DOCUMENTS

EP   1020810 A2   7/2000

* cited by examiner

*Primary Examiner* — Daniel St Cyr

(57) ABSTRACT

An apparatus and system for operating a handheld barcode scanner in a presentation mode are provided. The apparatus includes an upright stand having a lower end for placement adjacent to a work surface, and an opposing upper end. The apparatus includes a lower mirror, an upper mirror and a dock all supported by the stand. The dock holds the handheld barcode scanner between the lower mirror and a scan volume above the work surface to define a first beam path segment between the handheld barcode scanner and the lower mirror. The upper mirror defines a second beam path segment between the upper mirror and the lower mirror, and a third beam path segment between the upper mirror and the scan volume. The first, the second and the third beam path segments define a beam path between the handheld scanner and the scan volume.

18 Claims, 4 Drawing Sheets

APPARATUS AND SYSTEM FOR OPERATING A HANDHELD BARCODE SCANNER IN A PRESENTATION MODE

BACKGROUND OF THE INVENTION

In some environments, such as retail checkout counters, presentation barcode scanners are used to scan merchandise and other objects. Generally mounted on counters, presentation scanners allow for quick hands-free scanning of objects by staff or customers. However, some objects may be too heavy, large, or awkwardly shaped to place upon the counter for scanning with the presentation scanner. In such cases, a handheld barcode scanner can be employed.

In order to allow for both hands-free presentation scanning and handheld scanning of objects that are difficult to scan via presentation, checkout counters may therefore be equipped with both a presentation scanner and a handheld scanner. This not only costly, but also inefficient, as swapping between scanners slows down the scanning process. Other checkout counters may be equipped with handheld scanners that can be converted into fixed scanners by way of cradling mechanisms. Some such mechanisms, however, do not offer presentation scanning mode. Other such mechanisms offer a presentation scanning mode, but require inconvenient and time-consuming actions to cradle or withdraw the handheld scanner from the mechanism. Conventional mechanisms may also obstruct the scanning workspace when the handheld scanner is cradled.

Accordingly, there is a need for an apparatus and system for operating a handheld barcode scanner in a presentation mode.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
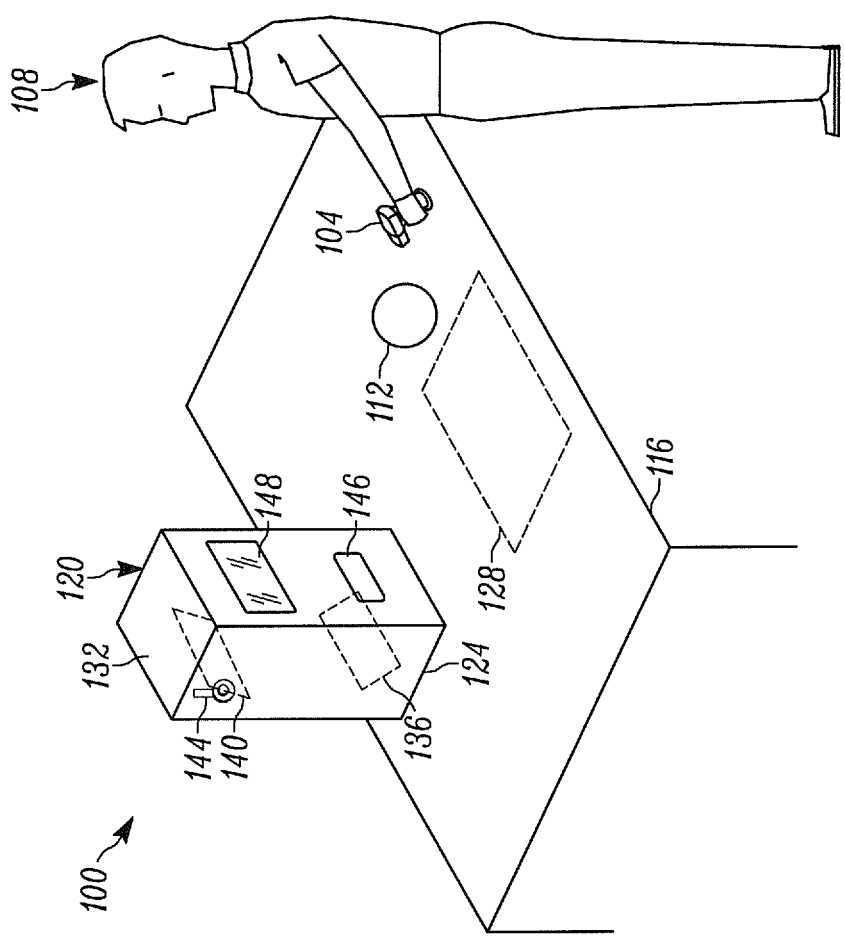
FIG. 1 is a system for operating an handheld barcode scanner in a presentation mode, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

According to some aspects of the specification, an apparatus is provided for operating a handheld barcode scanner in a presentation mode. The apparatus includes an upright stand having a lower end for placement adjacent to a work surface, and an opposing upper end. The apparatus includes a lower mirror supported by the stand, and a dock supported by the stand. The dock is for holding the handheld barcode scanner between the lower mirror and a scan volume above the work surface to define a first beam path segment between the handheld barcode scanner and the lower mirror. The apparatus also includes an upper mirror supported by the stand. The upper mirror defines a second beam path segment between the upper mirror and the lower mirror, and a third beam path segment between the upper mirror and the scan volume. The first, the second and the third beam path segments define a beam path between the handheld scanner and the scan volume.

FIG. 1 depicts a system 100 for operating a handheld barcode scanner in a presentation scanning mode. The system 100 includes a handheld barcode scanner 104 (also referred to herein simply as "scanner 104"), which can be any of a wide variety of types of scanner. Certain components of the scanner 104 will be discussed further below.

The scanner 104 is operable in two modes: a handheld mode and a presentation mode. In the handheld mode, illustrated in FIG. 1, the scanner 104 is manipulated by an operator 108 to scan objects, such as an object 112 on a counter 116. The scanner 104 can also be manipulated by the operator 108 to scan other objects (not shown) that are too large or heavy to place on the counter 116. In general, the scanner 104 defines a handheld scan volume comprising a space adjacent to the scanner 104 that is visible to one or more sensors within the scanner 104. As will now be apparent to those skilled in the art, the handheld scan volume is movable, by moving the scanner 104. Thus, the operator 108 can relocate the scanner 104 as needed in order to locate an object (such as the object 112) within the handheld scan volume.

The system 100 also includes an upright stand 120 for operating the scanner 104 in the presentation mode. The stand 120 has a lower end 124 for placement adjacent to a work surface 128, and an opposing upper end 132. The work surface 128, although illustrated in FIG. 1, need not actually be marked on the counter 116. As will become apparent throughout this description, the work surface 128 is a portion of the surface of the counter 116 (or any other structure on which the stand 120 is placed) that can be made visible to the scanner 104 by docking the scanner 104 in the stand 120. As seen in FIG. 1, when the stand 120 is installed on the counter 116, the upper end 132 is at a greater elevation relative to the counter 116 than the lower end 124.

The stand 120 also includes at least one side wall extending between the lower end 124 and the upper end 132. In the present example, four side walls are provided, and thus the lower end 124, the upper end 132 and the side walls form a box-shaped body. In other embodiments, the stand 120 can be provided in a wide variety of shapes. For example, rather than four planar side walls as shown in FIG. 1, a single cylindrical side wall can be provided. In still other embodiments, one or more of the side walls can be omitted (that is, the stand 120 can be open to the environment rather than closed).

In the present example, the stand 120 is movable on the counter 116, or indeed can be removed entirely from the counter 116 to be placed on another surface (not shown). In other embodiments, the stand 120 can be removably fastened to the counter 116 at the lower end 124, for example by way of one or more bolts, screws, latching mechanisms or the like. In still other embodiments, the stand 120 can be irremovably fastened with the counter 116 at the lower end 124, for example by welding or by forming the lower end 124 and the counter 116 integrally from the same piece of material (e.g. sheet metal).

In general, the stand 120 permits the conversion of the scanner 104 from the handheld mode illustrated in FIG. 1 to a presentation mode. Thus, the stand 120 includes a mechanism to releasably hold the scanner 104, and at least one mirror for redirecting the field of view of the scanner 104 towards the work surface 128 when the scanner 104 is so held.

In the present embodiment, the stand 120 supports a lower mirror 136 and an upper mirror 140. Both the lower mirror 136 and the upper mirror 140 are disposed above the work surface 128 when the stand 120 is installed on the counter 116, and the upper mirror 140 is at a greater elevation relative to the work surface 128 than the lower mirror 136. More specifically, the lower mirror 136 is adjacent to the lower end 124, and the upper mirror is adjacent to the upper end 132. In other embodiments, however, the lower mirror 136 and the upper mirror 140 can be deployed in various positions on the stand 120. In general, the upper mirror 140 is above the work surface 128 when the stand 120 is installed, and the lower mirror 136 is below the upper mirror 140 (that is, the lower mirror 136 is at a lower elevation relative to the work surface 128 than the upper mirror 140). The lower mirror 136 can, however, be located below the work surface 128 (for example, when the stand 120 is integrated with the counter 116).

The lower mirror 136 and the upper mirror 140 can be supported by the stand 120 in any suitable manner. In the present example, the lower mirror 136 is fixed between opposing side walls, and the upper mirror 140 is mounted between the same opposing side walls, for example on an axis. A lever or switch 144 coupled to the axis on which the upper mirror 136 is mounted can be manipulated by the operator 108 to rotate the upper mirror 140, changing its angle.

The stand 120 also supports a dock 146 and a window 148. The dock 146 removably receives the scanner 104 and holds the scanner 104 for operating in a presentation mode. The dock 146 can have any of a variety of suitable structures, such as an opening in a side wall of the stand 120, as shown in FIG. 1. The window 148 permits the exit and entry of light out of and into the stand 120, as will be discussed below.

Figure 2:
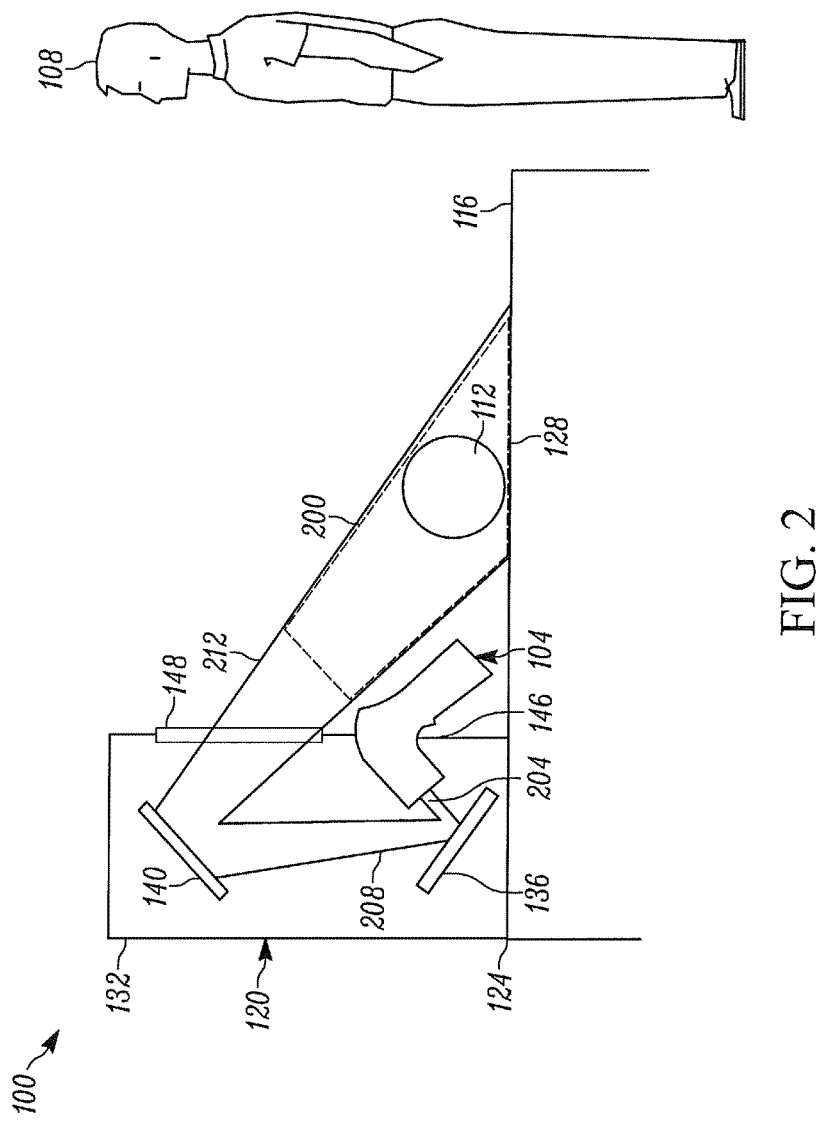
FIG. 2 is a cross-sectional elevation of the system of FIG. 1 in accordance with some embodiments.

Referring now to FIG. 2, a cross-sectional elevation of the stand 120 is depicted, with the scanner 104 operating in the presentation mode. In the presentation mode, the dock 146 holds the scanner 104 between the lower mirror 136 and a scan volume 200 above the work surface 128. The scan volume 200 is the volume of space visible to the scanner 104 when the scanner 104 is docked in the stand 120. As seen in FIG. 2, docking the scanner 104 within the stand 120 involves inserting (e.g. by operator 108) at least a portion of the scanner 104 through the opening in the stand 120 defined by the dock 146.

When the scanner 104 is held by the dock 146 in the position shown in FIG. 2, a first beam path segment 204 is defined between the scanner 104 and the lower mirror 136. In other words, the dock 146 holds the scanner 104 such that a light emitter and a sensor of the scanner 104 can emit light towards the lower mirror 136, and receive light from the lower mirror 136.

The upper mirror 140 defines a second beam path segment 208 between the lower mirror 136 and the upper mirror 140, and a third beam path segment 212 between the upper mirror 140 and the scan volume 200. The first beam path segment 204, the second beam path segment 208, and the third beam path segment 212 together define a beam path between the scanner 104 and the scan volume 200. Therefore, light (e.g. laser light) emitted by the scanner 104 travels to the scan volume 200 via the lower mirror 136 and the upper mirror 140. In addition, a portion of the light emitted from the scanner 104 is reflected by the object 112 back towards the upper mirror 140, and then to the scanner 104 via the lower mirror 136.

In order to return the scanner 104 from the presentation mode to the handheld mode, the operator 108 need only reach through the scan volume 200 and withdraw the scanner 104 from the dock 146.

Figure 3:
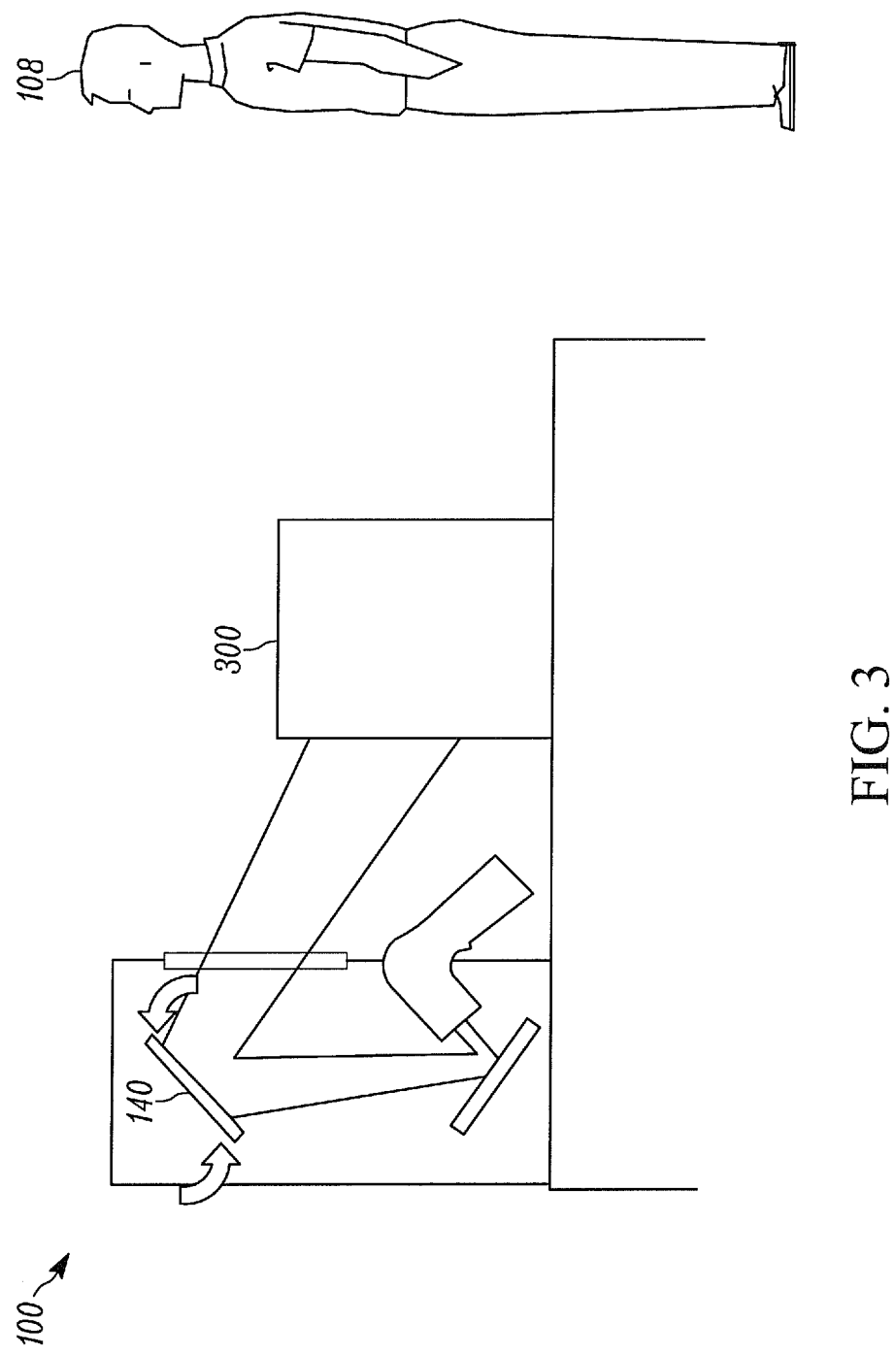
FIG. 3 is a further cross-sectional elevation of the system of FIG. 1 in accordance with some embodiments.

Referring now to FIG. 3, it may be necessary to adjust the position of the scan volume defined by the scanner 104 and the stand 120 in the presentation mode. By moving the lever 144 (shown in FIG. 1), the upper mirror 140 can be rotated about the axis on which it is mounted, thus relocating the scan volume 200, for example to scan a larger object 300 bearing a bar code that did not fall within the scan volume 200.

The stand 120 can be employed with any of a wide variety of conventional scanners. However, the scanner 104 in some embodiments can have additional features for altering the configuration of the scanner 104 when transitioning between the handheld and presentation modes. Those features will be discussed below.

Figure 4:
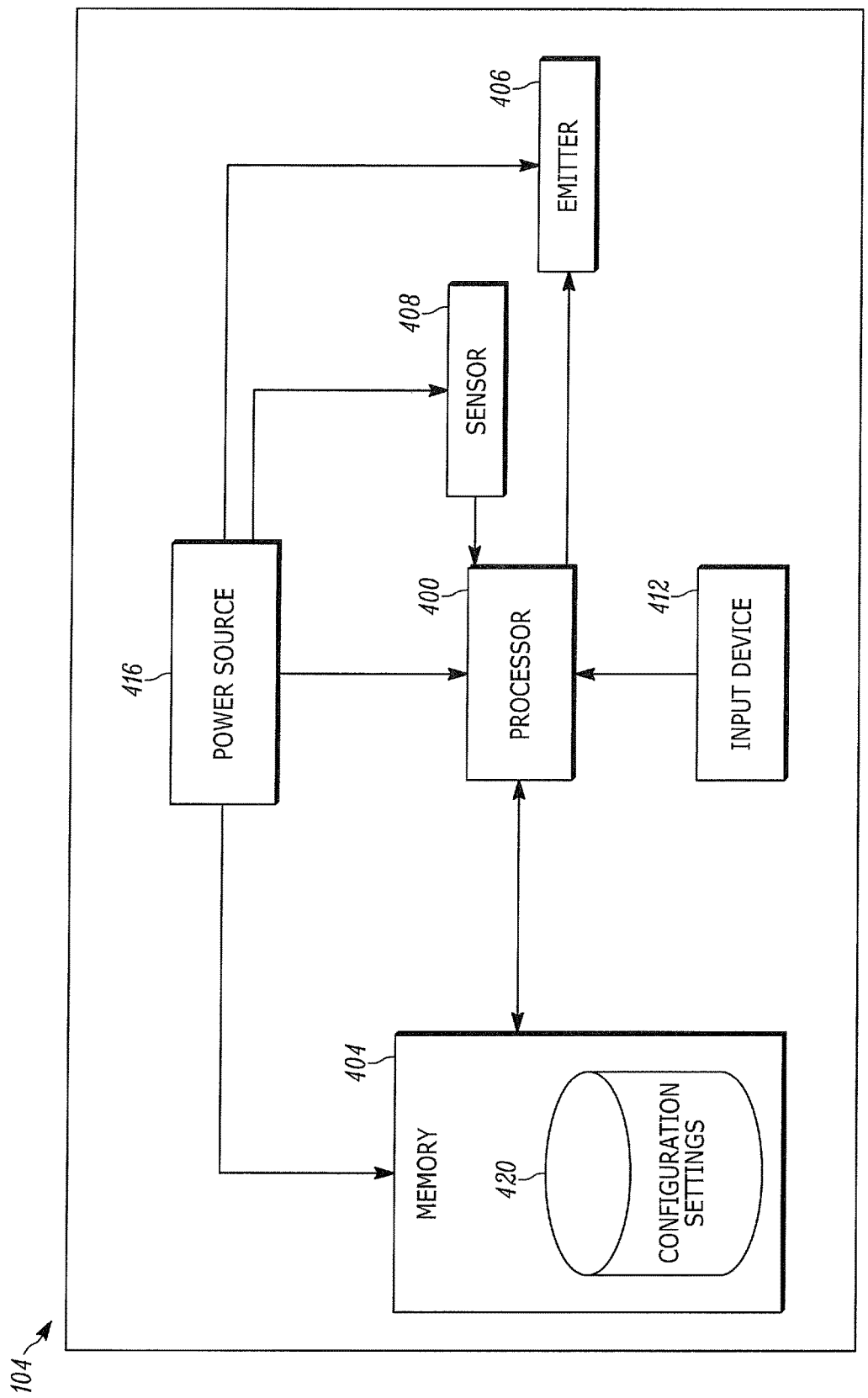
FIG. 4 is a block diagram of certain internal components of the scanner of FIG. 1 in accordance with some embodiments.

Referring now to FIG. 4, a block diagram of certain internal components of the scanner 104 is depicted. The scanner 104 includes a processor 400 interconnected with a memory 404. The processor 400 and the memory 404 can each comprise one or more integrated circuits (IC). The processor 400 runs or executes operating instructions or programs that are stored in the memory 404 to perform various functions for the scanner 104 and to process data. For example, the processor 400 can include one or more microprocessors, microcontrollers, digital signal processors (DSP), state machines, logic circuitry, or any device or devices that process information based on operational or programming instructions stored in the memory 404.

The scanner 104 also includes at least one light emitter 406, at least one light sensor 408, at least one input device 412, and a power source 416 (e.g. a battery or a cord (not shown) connecting the scanner 104 to an external power source such as a wall outlet) supplying power to the above-mentioned components. In some embodiments, the scanner 104 can include additional components (not shown) such as a network interface for communicating with other devices such as a point-of-sale computer, a display, a speaker and the like. The components of the scanner 104 can be contained within a housing (not shown) constructed of any suitable material, or combination of materials (e.g. plastics, metals, and the like).

The emitter 406 can emit any suitable form of light, and in the present embodiment emits laser light at a predetermined frequency, or set of frequencies. The sensor 408 can be any type of sensor suitable for detecting reflected portions of the light emitted by the emitter 406. In some embodiments, the scanner 104 can be an imaging scanner, and thus the emitter 406 can be omitted and the sensor 408 can be, for example, a charge-coupled device (CCD) or other image sensor. In further embodiments, the scanner 104 can include a plurality of sensors 408. For example, the scanner 104 can include a first sensor with a given range or focal length, and a second sensor with a different (e.g. longer or shorter) range or focal length. Similarly, in some embodiments the scanner 104 can include a plurality of emitters 406 with varying power levels (e.g. a high-power emitter for operation with a long range sensor, and a low-power emitter for operation with a short range sensor).

The input device 412 can include a trigger or other actuator for depression by the operator 108 to initiate a scan operation, in which the sensor 408 captures an image or otherwise measures light incident on the sensor 408, and the processor 400 decodes the image or other measurement taken by the sensor 408. In some embodiments, the input device 412 can also include a detection device, such as a magnetic sensor for detecting a magnetic element embedded in the stand 120 adjacent to or on the dock 146.

Stored in the memory 404 is a plurality of configuration settings 420. The configuration settings include parameters for controlling the behaviour of the various input and output devices of the scanner 104 (e.g. the trigger, the sensor 408, the emitter 406). In particular, the configuration settings 420 can include a first set of parameters corresponding to the handheld mode, and a second set of parameters corresponding to the presentation mode.

The processor 400 is configured to detect the current mode of the scanner 104 and, in response, to select the set of parameters corresponding to that mode. The manner in which the processor 400 detects the current mode is not particularly limited. For example, in some embodiments the stand 120 can also include a power source with a connector adjacent to the dock 146, for supplying power to the scanner (and charging a battery of the scanner 104) during operation in the presentation mode. Thus, the processor 400 can be configured, via execution of instructions stored in the memory 404, to detect when the power source 416 is connected to the power source of the stand 120. When such a detection is made, the processor 400 can select the set of parameters corresponding to the presentation mode and control the input and output devices of the scanner 104 according to the selected parameters. Conversely, when the power source 416 is not connected to the power source of the stand 120, the processor 400 can be configured to select the parameters corresponding to the handheld mode.

In other embodiments, the processor 400 can receive input data from the magnetic sensor mentioned above, indicating the presence or absence of a magnetic field in proximity to the magnetic sensor. When data is received at the processor 400 indicating the presence of a magnetic field (due to proximity of the scanner 104 to the dock 146), the processor 400 can select the set of parameters corresponding to the presentation mode. Conversely, when data is received at the processor 400 indicating the absence of a magnetic field (due to the scanner 104 having been withdrawn from the dock 146), the processor can select the parameters corresponding to the handheld mode. Other sensors can also be employed instead of, or in addition to, the magnetic sensor for detecting proximity of the scanner 104 to the stand 120. For example, the scanner 104 can include any suitable combination of inductive sensors (for detecting the presence of metallic surfaces in contact with the sensor), mechanical buttons (depressed when contacting a surface of the stand 120), and the like.

Examples of the configuration settings 420 are provided below in Table 1. In general, the parameters corresponding to the presentation mode configure the scanner for operation at a longer range, due to the beam folding provided by the stand 120—as illustrated between FIGS. 1 and 2, the beam path distance from the scanner 104 to the object 112 is greater in the presentation mode than in the handheld mode. Thus, in the presentation mode, the processor 400 can control the scanner 104 to emit light at a greater intensity (by adjusting the output of the emitter 406 or by enabling a more powerful emitter), adjust a range or focal length upwards (by adjusting the range of the sensor 408 or by enabling a long-range sensor), and the like. Further examples of presentation mode-specific parameters include disabling the trigger of the scanner 104, and enabling an auto-scan mode, in which the scanner 104 constantly emits and detects light rather than doing so only when the trigger is depressed. In the handheld mode, adjustments in the opposite direction to those mentioned above and shown in Table 1 can be made.

TABLE 1

Example Configuration Settings 420

| Parameter | Presentation Value | Handheld Value |
| --- | --- | --- |
| Light emitted | High | Low |
| Range | Long | Short |
| Trigger Function | Disabled | Enabled |
| Auto-Scan Function | Enabled | Disabled |

Although parameters such as "high" and "long" are shown above for illustrative purposes, any suitable parameters may be employed. For example, rather than the range value "long", an exact focal length measurement can be stored in configuration settings 420.

Variations to the above are contemplated. For example, although the stand 120 as discussed herein includes two mirrors, in other embodiments a smaller or greater number of mirrors may be employed. In addition, other optical elements such as lenses may be employed in some embodiments. When other optical elements are included in the scanner 104, the configuration settings 420 can specify various adjustments of such optical elements.

In further variations, an upper portion of the stand 120, containing the upper mirror 140 and the window 148, may be rotatable in relation to a lower portion of the stand 120 (containing the lower mirror 136 and the dock 146). For example, the upper portion of the stand 120 may be mounted on an axis, one or more ball bearings in the wall of the stand 120, or the like. In such a configuration, the upper portion of the stand 120 may be rotated relative to the lower portion of the stand 120 to relocate the scan volume 200. For example, referring to FIG. 2, a ninety-degree rotation of the upper portion of the stand 120 may be employed to reposition the scan volume 200 from a space in between the stand 120 and the operator 108 to a position to the left of the stand 120, relative to the operator 108. In such embodiments, because the dock 146 and the lower mirror 136 remain stationary, it may no longer be necessary for the operator 108 to reach through the scan volume in order to retrieve the scanner 104 from the stand 120. In still other embodiments, the above-mentioned upper portion of the stand may be mounted at a fixed angle relative to the lower portion of the stand 120, rather than being rotatable. For example, the stand 120 may be structured such that dock 146 appears in the side of the stand 120 facing the operator 108, while the window 148 appears in a different side, perpendicular to the dock 146.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. An apparatus for operating a handheld barcode scanner in a presentation mode, comprising:
   an upright stand having a lower end for placement adjacent to a work surface, and an opposing upper end;
   a lower mirror supported by the stand;
   a dock supported by the stand, the dock for holding the handheld barcode scanner between the lower mirror and a scan volume above the work surface to define a first beam path segment between the handheld barcode scanner and the lower mirror; and
   an upper mirror supported by the stand, the upper mirror defining a second beam path segment between the upper mirror and the lower mirror, and a third beam path segment between the upper mirror and the scan volume;
   the first, the second and the third beam path segments defining a beam path between the handheld scanner and the scan volume,
   the stand having:
      a lower portion supporting the lower mirror and the dock; and
      an upper portion supporting the upper mirror, the upper portion connected to the lower portion and rotatable relative to the lower portion for redirecting the third beam path segment.

2. The apparatus of claim 1, further comprising at least one side wall extending between the upper end and the lower end.

3. The apparatus of claim 2, the at least one side wall, the upper end and the lower end forming a body enclosing the lower mirror and the upper mirror.

4. The apparatus of claim 2, further comprising a window in the at least one side wall for allowing passage to the third beam path segment.

5. The apparatus of claim 2, the dock further comprising an opening in the at least one side wall for receiving at least a portion of the handheld barcode scanner.

6. The apparatus of claim 1, the upper mirror mounted adjacent to the upper end, and the lower mirror mounted adjacent to the lower end.

7. The apparatus of claim 1, further comprising a power source connected to the stand for supplying power to the handheld barcode scanner.

8. A system, comprising:
a handheld barcode scanner;
an upright stand having a lower end for placement adjacent to a work surface, and an opposing upper end;
a lower mirror supported by the stand;
a dock supported by the stand, the dock for holding the handheld barcode scanner between the lower mirror and a scan volume above the work surface to define a first beam path segment between the handheld barcode scanner and the lower mirror; and
an upper mirror supported by the stand, the upper mirror defining a second beam path segment between the upper mirror and the lower mirror, and a third beam path segment between the upper mirror and the scan volume;
the first, the second and the third beam path segments defining a beam path between the handheld scanner and the scan volume;
the stand having:
a lower portion supporting the lower mirror and the dock; and
an upper portion supporting the upper mirror, the upper portion connected to the lower portion and rotatable relative to the lower portion for redirecting the third beam path segment.

9. The system of claim 8, further comprising at least one side wall extending between the upper end and the lower end.

10. The system of claim 9, the at least one side wall, the upper end and the lower end forming a body enclosing the lower mirror and the upper mirror.

11. The system of claim 9, further comprising a window in the at least one side wall for allowing passage to the third beam path segment.

12. The system of claim 9, the dock further comprising an opening in the at least one side wall for receiving at least a portion of the handheld barcode scanner.

13. The system of claim 8, the upper mirror mounted adjacent to the upper end, and the lower mirror mounted adjacent to the lower end.

14. The system of claim 8, further comprising a power source connected to the stand for supplying power to the handheld barcode scanner.

15. The system of claim 8, the handheld barcode scanner including a processor interconnected with a memory, a light sensor, and a trigger.

16. The system of claim 15, the memory storing a first set of configuration parameters corresponding to a presentation mode, and a second set of parameters corresponding to a handheld mode.

17. The system of claim 16, the processor configured to detect a mode of the handheld barcode scanner, and to select one of the first and second set of parameters corresponding to the detected mode.

18. The system of claim 17, the processor configured to detect the presentation mode by detecting that the handheld barcode scanner is proximal to the stand.

* * * * *